United States Patent [19]
Siepker

[11] Patent Number: 6,053,581
[45] Date of Patent: Apr. 25, 2000

[54] PROCESS AND SYSTEM FOR BRIEFLY STOPPING A VEHICLE

[75] Inventor: Achim Siepker, Munich, Germany

[73] Assignee: Bayerische Motoren Werke Aktiengesellschaft, Munich, Germany

[21] Appl. No.: 08/903,744

[22] Filed: Jul. 31, 1997

[30] Foreign Application Priority Data

Jul. 31, 1996 [DE] Germany .............. 196 30 871

[51] Int. Cl.[7] ................................. B60T 13/74
[52] U.S. Cl. .................. 303/3; 303/24.1; 188/106 P
[58] Field of Search .................... 303/2, 9, 9.62, 303/9.61, 24.1, 3; 188/106 P

[56] References Cited

U.S. PATENT DOCUMENTS

| | | |
|---|---|---|
| 3,895,698 | 7/1975 | Fontaine . |
| 4,778,223 | 10/1988 | Inoue ............................ 188/106 P |
| 5,328,251 | 7/1994 | Brearley ............................ 303/9 |
| 5,415,466 | 5/1995 | Breen et al. ....................... 303/9.61 |
| 5,415,467 | 5/1995 | Utz et al. ............................ 303/89 |
| 5,427,440 | 6/1995 | Ward et al. ........................... 303/7 |
| 5,584,538 | 12/1996 | Takasaki ............................. 303/89 |
| 5,916,062 | 6/1999 | Siepker ............................ 303/24.1 |

FOREIGN PATENT DOCUMENTS

| | | |
|---|---|---|
| 42 36 240 | 7/1975 | Germany . |
| 43 32 459 | 3/1995 | Germany . |

*Primary Examiner*—Paul N. Dickson
*Assistant Examiner*—Thomas J. Williams
*Attorney, Agent, or Firm*—Evenson, McKeown, Edwards & Lenahan, P.L.L.C.

[57] ABSTRACT

A process and a system for briefly stopping a vehicle which utilizes a secondary brake circuit. In the present case, the problem is to be solved that the vehicle operator must exercise high brake holding forces in a stopped condition and, because of a constant slip stick effect, there will be a brake creaking. This object is achieved in that a braking intervention is carried out by an external power or secondary brake circuit when the vehicle speed falls below a defined limit value and an active braking intervention by the vehicle operator takes place beyond a given first rate, the operation of the brake pedal being continuously monitored by the vehicle operator.

18 Claims, 4 Drawing Sheets

PROCESS AND SYSTEM FOR BRIEFLY STOPPING A VEHICLE

CROSS-REFERENCE TO RELATED APPLICATIONS

This application is related to U.S. patent application Ser. No. 08/903,745, of common inventorship and common ownership.

BACKGROUND AND SUMMARY OF THE INVENTION

This application claims the priority of German Application No. 196 30 871.2, the disclosure of which is expressly incorporated by reference herein.

The invention relates to a process and a system for stopping a vehicle which utilizes a device for the braking intervention via an external power.

Because of the stiff converter, the high internal-combustion engine torque and the high, driving-performance-oriented starting ratio, particularly in the case of high-performance, top-of-the-line vehicles having an automatic transmission, the vehicles have a strong tendency to creep when in gear in a stopped condition. In addition, a socalled "brake creaking" may occur because of a constant slip stick (slipping) effect, which is the transition from the static friction to the sliding friction and vice versa. For solving this problem, German Patent Document DE 43 32 459 suggests aiding the braking effect of the vehicle service brake (operator controlled foot brake pedal) via a separate device. In this case, it is a disadvantage that the vehicle operator can leave the vehicle while the engine is running and the gear selector lever is engaged.

The separate device for aiding the braking effect increases the costs in a disadvantageous manner. In addition, in the case of an excessive creeping action of the vehicle, the vehicle operator must apply a braking force which is dimensioned proportionally with respect to this creeping action even when there is additional assistance.

It is an object of the present invention to provide an improved and lower-cost process and system for stopping a vehicle.

This and other objects have been achieved according to the present invention by providing a process for stopping a vehicle having an operator-controlled primary brake circuit and a secondary brake circuit, comprising the steps of: sensing a velocity of the vehicle; sensing an operator-applied braking input to the primary brake circuit; applying an additional braking pressure via the secondary brake circuit when the velocity falls below a defined limit value and the operator-applied braking input is sensed; and terminating the applying step when the operator-applied braking input is no longer sensed.

This and other objects have also been achieved according to the present invention by providing a system for stopping a vehicle, comprising: an operator-controlled primary brake circuit; a secondary brake circuit controlled by a control unit; a velocity sensor which senses a velocity of the vehicle; a braking input sensor which senses an operator-applied braking input to the primary brake circuit; wherein the control unit applies an additional braking pressure via the secondary brake circuit when the velocity sensor senses a velocity below a defined limit value and the braking input sensor senses the operator-applied braking input, and wherein the control unit terminates applying the additional braking pressure when the braking input sensor no longer senses the operator-applied braking input.

Many of today's vehicles have devices for exercising a braking intervention by means of an external power or a secondary brake circuit. Such devices are, for example, a dynamic stability control or traction control system, an anti-slip control or the so-called anti-lock braking system. By means of the valves and pumps provided in these systems, it is possible to separate the brakes assigned to the individual wheels from the primary brake circuit and connect them to a secondary circuit which is normally acted upon by means of a pump by braking pressure. According to the operation of the pump and the corresponding control measures, more or less braking pressure can be supplied to the brake cylinders of the corresponding wheels. As a result of the utilization of the already existing devices, it is no longer necessary to take separate measures, as known, for example, from German Patent Document DE 43 32 459. Also, the insufficient metering capacity of the vehicle user must no longer be used but a braking pressure can be automatically determined which is adapted to the respective conditions.

In the process according to the invention, at a certain rate or input of the braking intervention, the brake pressure is first "shut in", i.e., maintained. The process according to the invention is carried out only below a certain vehicle limit speed and at an active braking intervention by the vehicle operator which exceeds a predetermined first rate. As the rate or input for the active braking intervention, the operation of the brake light switch or the recognition of a brake pressure which exceeds a predetermined limit value, for example, may be used, or a sensed position of the foot brake pedal. During the external braking operation, the input exercised by the vehicle operator, e.g., the input brake pressure, is constantly compared with given input values, e.g., given brake pressure values. As soon as the brake pressure falls below these given brake pressure values, the braking intervention is terminated. For example, the conclusion can be drawn from sensing a brake pressure which is lower than a given limit value that the driver does not want to stop at that time.

As soon as the braking intervention takes place via an external power or secondary brake circuit, brake pressure is no longer applied to the individual wheels via the primary brake circuit controlled directly by the vehicle operator because the primary brake circuit (master brake cylinder) is uncoupled from the wheels via valves.

Other vehicle conditions, such as the engaged gear position (for example, R, D, 3, 2, 1) or the operation of the engine may also be queried and can be included in the decision of whether to initiate an external braking operation via the secondary brake circuit.

A value corresponding to the actual brake pressure is preferably stored at the start of the external braking operation. As a result of the comparison of a desired brake pressure value corresponding, for example, to a position of the foot brake pedal, with the stored brake pressure value, a conclusion can be drawn concerning the driver's intention, for example, with respect to intending to carry out parking maneuvers or starting.

According to certain preferred embodiments of the present invention, at the start of the external braking operation via the secondary brake circuit, the brake pressure is increased by an offset amount, specifically preferably according to a fixed pressure buildup function. A slow increase of the brake pressure ensures that the vehicle will stop smoothly if it has not yet stopped completely, which can be required particularly in the case of the passive rotational speed sensors. This gives the vehicle operator the impression of a slowly coasting-out vehicle.

At the conclusion of the external braking intervention, the brake pressure should preferably be reduced according to a fixed course. As a result, a jerky starting is avoided.

Other objects, advantages and novel features of the present invention will become apparent from the following detailed description of the invention when considered in conjunction with the accompanying drawings.

DETAILED DESCRIPTION OF THE DRAWINGS

Figure 6:
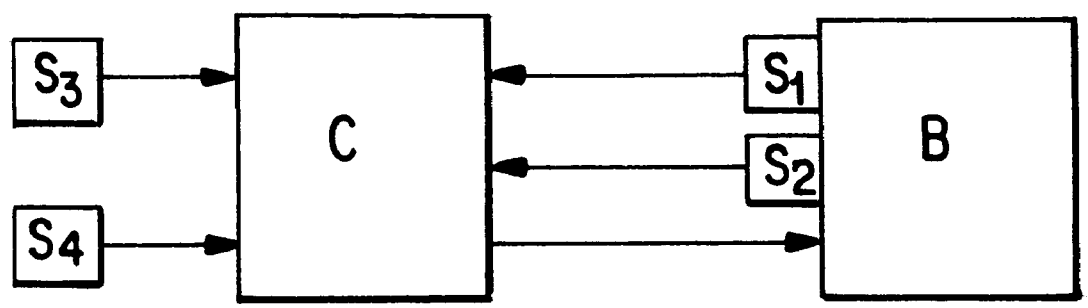
FIG. 6 schematically shows a system for stopping a vehicle according to a preferred embodiment of the present invention.

Referring to FIG. 6, a motor vehicle has an internal-combustion engine and an automatic transmission, and a secondary brake circuit B which may be selectively uncoupled from the primary brake circuit (master brake cylinder) controlled via the foot brake pedal and can be operated via an external power. In addition, a brake operating switch $S_1$, a device for sensing the brake pressure $S_2$, a vehicle speed sensor $S_3$ and an automatic transmission driving position sensor $S_4$ are provided. All detecting devices and sensors are connected with an electronic control unit C which, at the corresponding existing driving conditions, can selectively uncouple the secondary brake circuit B from the primary brake circuit and can control the secondary brake circuit via a pump and/or valves.

External power systems which are particularly suitable for the process according to the invention are, for example, the so-called anti-slip control or anti-lock braking system and the dynamic stability control or traction control system which have pressure maintaining valves and pump assemblies. The above-mentioned control possibilities are well known and are not discussed in further detail herein.

Figure 4:
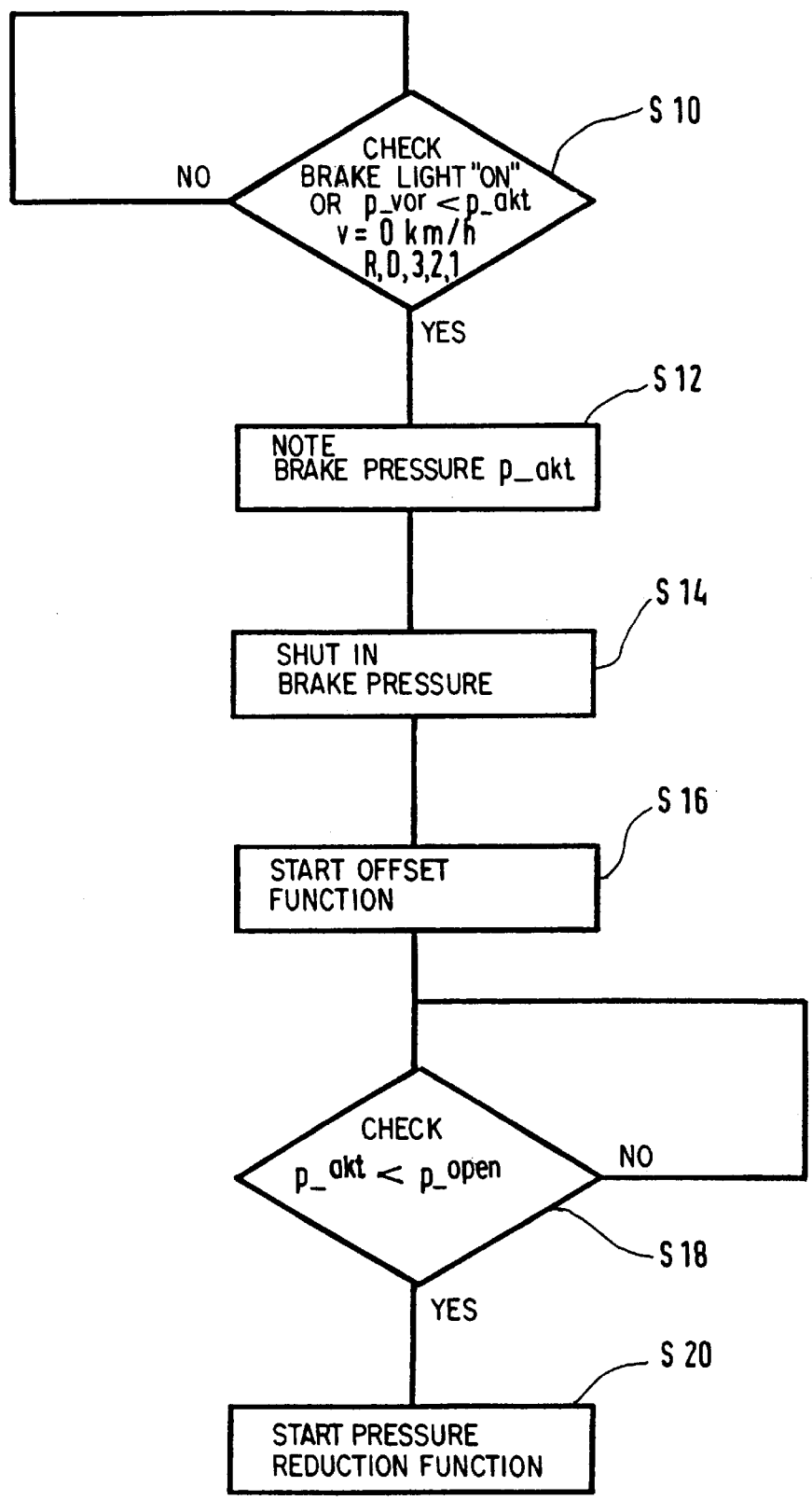
FIG. 4 is a flow chart of a special embodiment of the process according to the invention.

During the operation of the process, it is constantly determined according to Step 10 of FIG. 4 whether a gear position R, D, 3, 2 or 1 is engaged and the speed corresponds to 0 km/h. With respect to the speed, it should be noted that the rotational speed resolution may be at approximately 0.75 km/h so that a speed of 0 km/h will also be determined if the vehicle is still slightly rolling.

As an alternative, it can be determined in Step 10 whether the brake light switch is "on" or a certain brake pressure value is exceeded by the operation of the foot brake pedal by the vehicle operator (p_vor<p_akt).

If one of these conditions is not met, a branch-off takes place to the start and the checking takes place again ("no" in FIG. 4).

If all above-mentioned conditions are met, the actual brake pressure p_akt is stored in Step 12.

By closing valves in the brake circuit, the brake pressure is "shut in" or maintained in Step 14; that is, it is uncoupled from the primary brake circuit. When the brake circuit is uncoupled from the primary brake circuit, it can be acted upon by brake pressure from the secondary circuit.

Subsequently, according to Step 16 in FIG. 4, an "offset function" is started. As mentioned above, the rotational wheel speed resolution reaches approximately 0.75 km/h. In order to prevent, in the case of the above-mentioned activating conditions, the system shutting in the brake pressure by means of the hydraulic valves when the vehicle is still rolling and the driver also desires this condition, the "offset function" is carried out starting with step 21 in FIG. 5.

Figure 5:
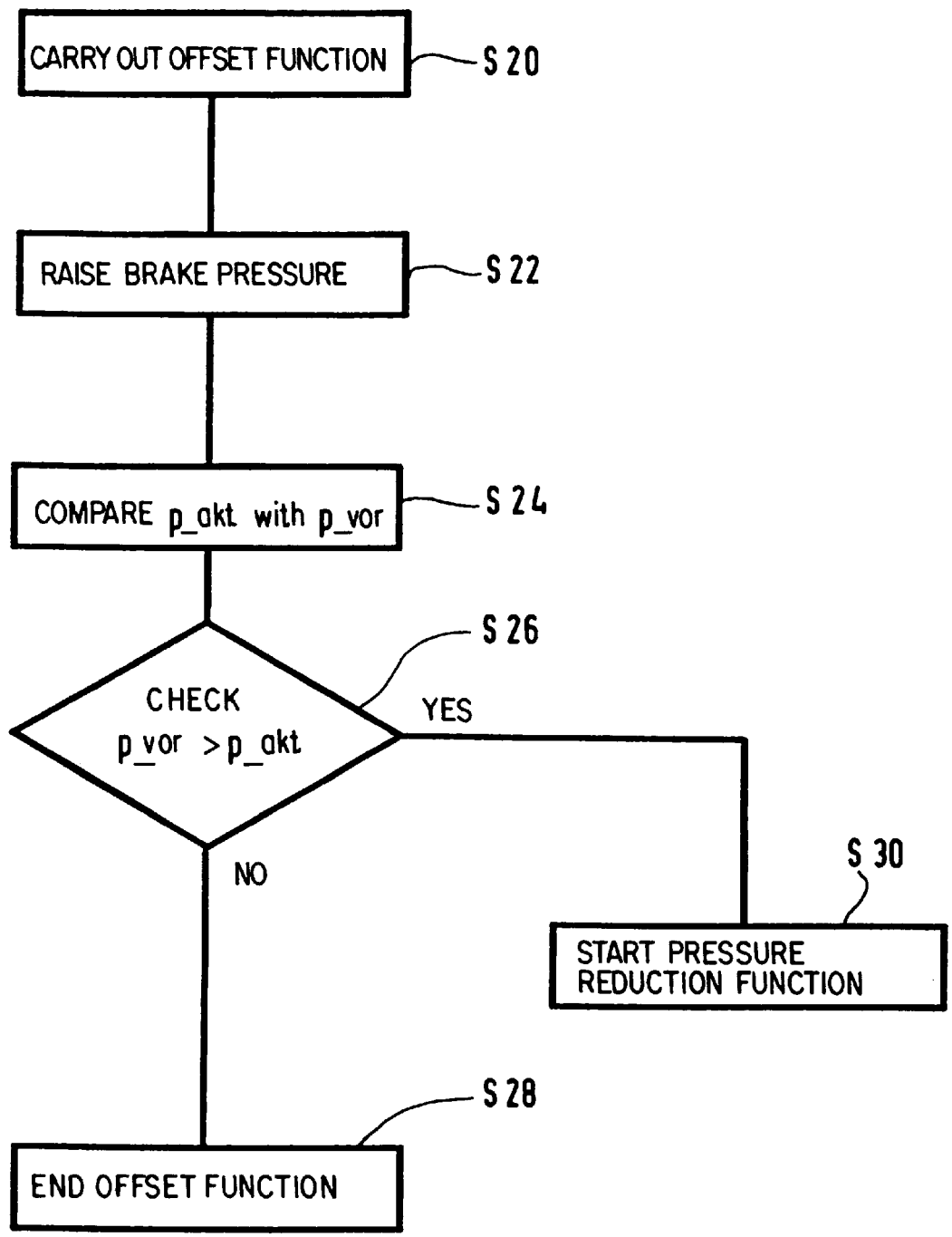
FIG. 5 is a flow chart of the offset function from FIG. 4.

According to FIG. 5, in Step 22, the brake pressure is increased via a return pump by an offset amount p_Offset, according to a pressure buildup function p_akt=f(t). In this case, the pressure is slowly increased by a small amount so that the vehicle can slowly coast out. The driver perceives this slight pressure buildup as an increased friction moment which causes a smooth coasting-out. During the implementation of the offset function of FIG. 5, the desired brake pressure generated by the driver is constantly monitored, for example via a position of the foot brake pedal. If a pressure reduction below a defined value takes place by the driver (Step 26, p_vor>p_akt), an immediate cessation of the process takes place by means of a corresponding pressure reduction (Step 30 in FIG. 5). If, during the implementation of the offset function, no desired reduction of the brake pedal pressure by the driver is determined, the offset function according to Step 28 is terminated when the defined pressure is reached and a return to Step 16 (FIG. 4) takes place.

The offset function causes a slight falling-away of the brake pedal which represents an acknowledgment to the driver. Subsequently, it is continuously checked in Step 18 of FIG. 4 whether the desired brake pressure p_akt exercised by the vehicle operator is lower than a limit brake pressure at which the process must be terminated (p_open). If this is not so, a checking will take place until this condition exists (yes).

If the above-mentioned condition exists, the "pressure reduction function" is started in Step 20 of FIG. 4.

If, as an alternative, a checking takes place in Step 10 as to whether the brake light switch is "on", it is naturally checked in Step 20 whether the brake light is deactivated.

By checking the brake pressure, the pressure reduction function should be initiated at a brake pressure p_open>0 bar so that a metered parking operation will be possible by means of the still existing residual creep moment.

By way of the brake pedal pressure threshold, which is determined by the opening pressure p_open, an early recognition of the driver's intention takes place, for example, in the direction of "start of drive" and "parking maneuver". The information can be transmitted to an automatic transmission control AGS. It is possible to shift the automatic transmission during the traffic light stop function into a different, more economical gear position and shift back in time by way of the information of the early recognition into a gear position corresponding to the starting operation. This function causes an energy reduction when the vehicle stops briefly. A secondary effect is again a reduction of the slip stick effect.

The intention to carry out a parking maneuver can, in addition, be recognized via the activation of a parking distance control. Depending on this function, a shift can take place to another brake release function and possibly to another converter function in order to eliminate a possible goal conflict between the ability to carrying out a parking maneuver by means of an automatic creep moment, low brake holding forces in the stop-and-go traffic and a low energy consumption. For an adaptation to the slope and gradient, the angle of tilt can also be processed.

Figure 1:
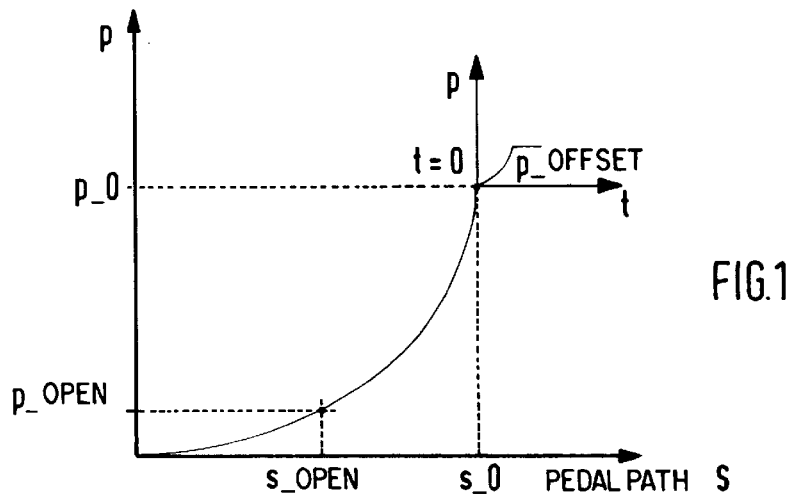
FIG. 1 is a diagram of the pressure buildup of the brake pressure in the case of a braking intervention by means of an external power according to a preferred embodiment of the present invention.

FIG. 1 shows a diagram in which the pressure p is mapped as a function of the operator-controlled foot brake pedal path S. In the case of a pedal path S, as of which a brake light switch is operated, the pressure increases corresponding to the curve indicated in FIG. 1 between the pedal path S=0 and S_0. S_0 is the brake pedal path which is just sufficient for suppressing the creep moment. When a pedal path of S_0 is reached, the above-described process is carried out. The brake circuit is uncoupled from the master brake cylinder and the secondary brake circuit starts to operate. At this point in time t=0, the brake pressure is shut in and is slightly increased corresponding to a given function f(t) in order to, as mentioned above, take the fact into account that also in the case of a speed sensing of 0 km/h, a slight rolling of the vehicle is still possible. After a defined time has passed, the "offset pressure value" will be reached and is maintained until the brake pedal path falls below a value s_open (=p_open). A pressure reduction signal will then be generated.

Figure 2:
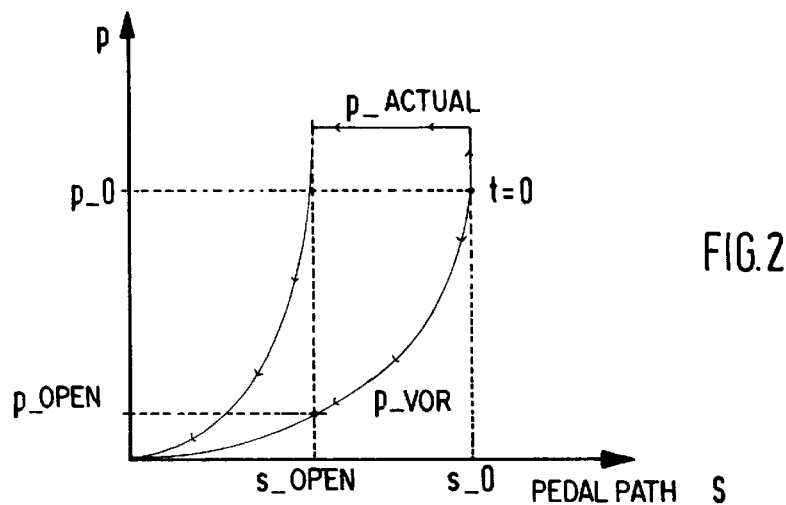
FIG. 2 is a diagram of the pressure reduction function at the conclusion of the braking intervention.

FIG. 2 shows representation which further characterizes the pressure reduction. Starting from the defined pedal path S_0, the pressure is increased by way of the offset function and is not reduced again before the pedal value falls below a given limit value s_open. When the brake pedal position value falls below this limit value s_open, the brake pressure reduction takes place according to a given course.

Figure 3:
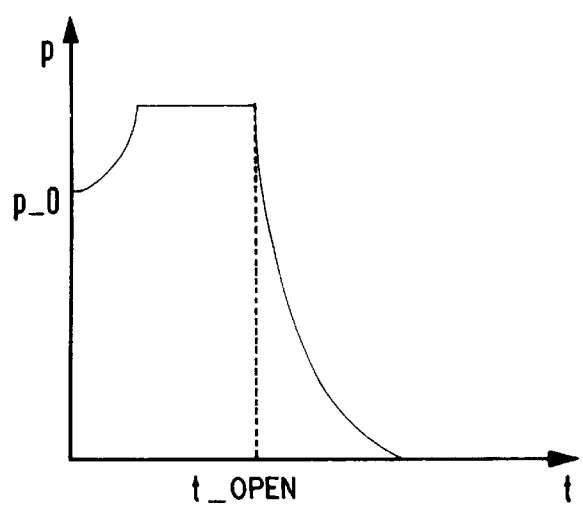
FIG. 3 is a diagram of the pressure over the time in which the braking intervention by means of the external power is carried out.

FIG. 3 shows the overall time sequence with respect to the braking intervention by means of an external power. During the implementation of the above-described process, the master brake cylinder is uncoupled from the brakes, the secondary brake circuit is activated and via the offset function a transition to the offset pressure value takes place. This pressure value is maintained until a pressure reduction signal is generated, specifically at the point in time $t_{open}$. As of this point in time, the brake pressure will fall corresponding to a given curve. When the brake pressure has fallen below a certain value or has returned to 0 bar, a switch back to the normal operation takes place.

According to the invention, an improvement of a brief stopping, for example, in a stop-and-go operation, is ensured in a simple manner. By reducing the holding forces, additional comfort is gained. The energy consumption can be reduced by adapting the converter function. In addition, the process according to the invention can be implemented at reasonable cost because no additional expenditures with respect to technical devices are required in a vehicle where the possibility of a braking intervention by way of external power is already available.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for stopping a vehicle having an operator-controlled primary brake circuit and a having a secondary brake circuit controlled by a control unit, said primary and secondary brake circuits being selectively communicable with a vehicle brake to apply a braking pressure thereto, comprising the steps of:

sensing a velocity of the vehicle;

sensing an operator-applied braking input to said primary brake circuit which applies said braking pressure to said vehicle brake; and decoupling said primary brake circuit from said vehicle brake and maintaining or increasing said braking pressure via said secondary brake circuit by way of said control unit when the velocity falls below a defined limit value and said operator-applied braking input is sensed.

2. A process according to claim 1, wherein said decoupling and maintaining or increasing step is effected when said operator-applied braking input exceeds a first defined limit value.

3. A process according to claim 1, wherein said decoupling and maintaining or increasing step is terminated when said operator-applied braking input falls below a second defined limit value.

4. A process according to claim 2, wherein said decoupling and maintaining or increasing step is terminated when said operator-applied braking input falls below a second defined limit value.

5. A process according to claim 1, wherein said step of sensing said operator-applied braking input comprises sensing at least one of (a) a braking pressure applied via a foot brake pedal, (b) a position of said foot brake pedal, and (c) an operation of a brake light switch.

6. A process according to claim 1, wherein said decoupling and maintaining or increasing step is further controlled as a function of at least one of (a) other operating conditions of said vehicle, and (b) environmental conditions.

7. A process according to claim 1, wherein at an initiation of said decoupling and maintaining or increasing step, an actual braking pressure is measured and stored.

8. A process according to claim 1, wherein during said decoupling and maintaining or increasing step, the braking pressure is increased by an offset amount corresponding to a fixed pressure buildup function.

9. A process according to claim 3, wherein during termination of said decoupling and maintaining or increasing step, the braking pressure is reduced according to a fixed course.

10. A system for stopping a vehicle, comprising:

an operator-controlled primary brake circuit;

a secondary brake circuit controlled by a control unit;

said primary and secondary brake circuits being selectively communicable with a vehicle brake to apply a braking pressure thereto;

a velocity sensor which senses a velocity of the vehicle;

a braking input sensor which senses an operator-applied braking input to said primary brake circuit which applies said braking pressure to said vehicle brake;

wherein said control unit decouples said primary brake circuit from said vehicle wheel and maintains or increases said braking pressure via said secondary brake circuit when said velocity sensor senses a velocity below a defined limit value and said braking input sensor senses said operator-applied braking input.

11. A system according to claim 10, wherein said control unit maintains or increases said braking pressure via said secondary brake circuit when said braking input sensor senses an operator-applied braking input which exceeds a first defined limit value.

12. A system according to claim 10, wherein said control unit terminates maintaining or increasing said braking pressure via said secondary brake circuit when said braking input sensor senses an operator-applied braking input which falls below a second defined limit value.

13. A system according to claim 11, wherein said control unit terminates maintaining or increasing said braking pressure via said secondary brake circuit when said braking input sensor senses an operator-applied braking input which falls below a second defined limit value.

14. A system according to claim 10, wherein said braking input sensor senses at least one of (a) a braking pressure applied via a foot brake pedal, (b) a position of said foot brake pedal, and (c) an operation of a brake light switch.

15. A system according to claim 11, wherein said braking input sensor senses at least one of (a) a braking pressure applied via a foot brake pedal, (b) a position of said foot brake pedal, and (c) an operation of a brake light switch.

16. A system according to claim 10, wherein said control unit is further controlled as a function of at least one of (a) other operating conditions of said vehicle, and (b) environmental conditions.

17. A system according to claim 10, wherein said control unit increases said braking pressure by an offset amount corresponding to a fixed pressure buildup function.

18. A system according to claim 13, wherein said control unit terminates maintaining or increasing said braking pressure according to a fixed course.

* * * * *